United States Patent [19]

de Leeuw

[11] 4,443,127

[45] Apr. 17, 1984

[54] COUPLING

[76] Inventor: Petrus J. L. de Leeuw, B.V. Heesselstraat 5, Aarle-Rixtel, Netherlands

[21] Appl. No.: 316,275

[22] Filed: Oct. 29, 1981

[30] Foreign Application Priority Data

Oct. 30, 1980 [NL] Netherlands .......................... 8005954

[51] Int. Cl.³ .......................... F16D 1/00; F16D 3/00; F16L 41/00
[52] U.S. Cl. ........................................ 403/175; 52/81; 403/218; 403/261
[58] Field of Search ............... 403/174, 175, 178, 217, 403/218, 261, 405, 49; 52/81

[56] References Cited

U.S. PATENT DOCUMENTS

| 3,323,820 | 6/1967 | Braccini | 403/218 |
| 3,502,357 | 3/1970 | Wagner | 403/174 X |
| 3,528,164 | 9/1970 | Packman et al. | 403/218 X |
| 3,992,118 | 11/1976 | Siegers | 403/175 X |
| 4,283,156 | 8/1981 | Harper | 403/218 |
| 4,322,176 | 3/1982 | Johnson | 52/81 X |

FOREIGN PATENT DOCUMENTS 722310 5/1942 Fed. Rep. of Germany ...... 403/218

*Primary Examiner*—Wayne L. Shedd
*Attorney, Agent, or Firm*—Oblon, Fisher, Spivak, McClelland & Maier

[57] ABSTRACT

A coupling for intercoupling at least two orthogonal bars or tubes includes an annular member surrounding one of the bars and rigidly fastened thereto. A loose annular member is also positioned on the bar and cooperates with angled guide surfaces. The other bars are provided with links having recesses and projections which cooperate with recesses and projections of the annular members. The rotation of the loose annular member results in it locking the links to the bar, by the cooperation of the loose annular member and the guide surfaces.

15 Claims, 13 Drawing Figures

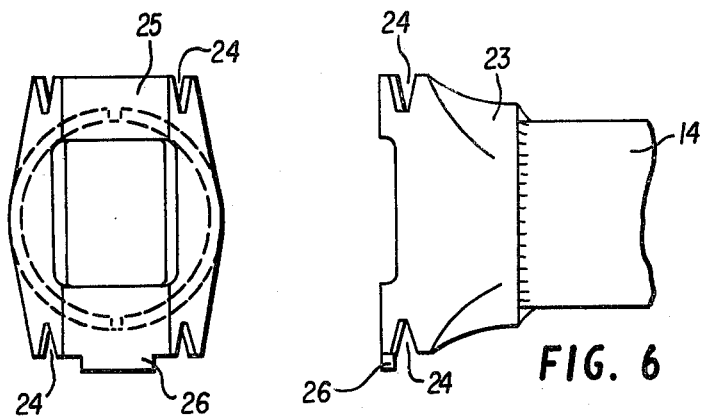
FIG. 6
FIG. 5
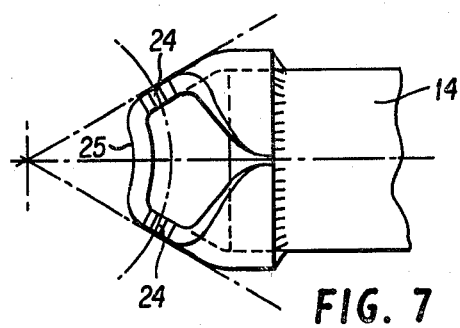
FIG. 7
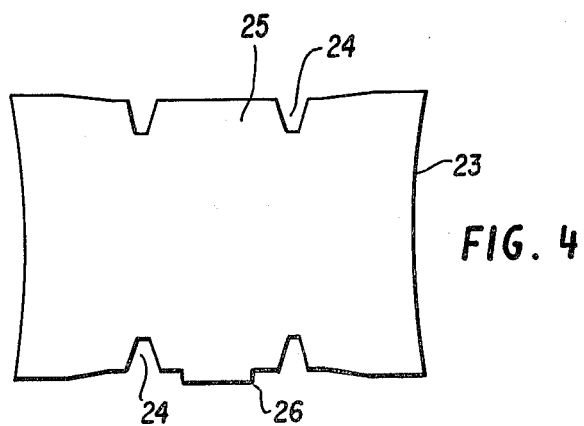
FIG. 4

COUPLING

The invention relates to a coupling for intercoupling at least two at least substantially orthogonal bars or tubes comprising an annular member surrounding one bar or tube and rigidly secured thereto, an annular member loosely arranged on said one bar or tube and a link fastened to one end of the other bar or tube and fitting in between the annular members, whilst for clamping tight the loose annular member at least one lug and a guide surface co-operating with said lug and being at an angle to a plane at right angles to the tube are provided.

Such a coupling, which is, for example, known from British Patent Specification No. 1,463,867 is frequently used for intercoupling metal pipes for erecting a scaffolding. In the construction known from the aforesaid British Patent Specification the lower annular member arranged on a pole is formed by a dish-shaped part welded by its lower end to the pole. The upper annular member is formed by a dish-shaped part slidable along the pole, whilst the link fastened to the end of a horizontal tube is provided with protruding tongues received in the spaces located between the outer periphery of the pole and the inner wall of the dish-shaped members arranged on the pole.

At a junction usually a plurality of horizontal beams are coupled with the pole. In the manufacture of the various parts establishing the connection between the pole and the horizontal tubes usually ample tolerance is observed. In this known construction the amount of play involved in the junction formed with the aid of the aforesaid coupling is dependent on the size of a large number of different parts such as the outer diameter of the pole, the inner diameter of the dish-shaped, annular members, the accuracy of the coaxial location of the annular members with respect to the pole, the thickness of the tongues falling between the outer wall of the pole and the inner wall of the dish-shaped members and the distance between said tongues measured in the direction of length of the pole.

In practice it therefore appears that frequently a comparatively high amount of play occurs in such a coupling which adversely affects the rigidity of the junction established with the aid of said coupling and hence the strength of the scaffolding. This is even aggravated by the fact that for clamping tight the loose annular member only one lug is welded to the pole for co-operation with a bevelled upper edge of this loose, annular member. Therefore, the annular member is pressed tight only at one point so that the annular member is likely to be pressed in an inclined position.

The invention has for its object to provide a coupling of the kind set forth in which the disadvantages inherent in the known coupling can be mitigated.

According to the invention this can be achieved by providing recesses and protruding noses respectively at the ends of the link facing the annular members, whilst the annular members are provided with protruding noses fitting in said recesses and respectively with recesses receiving the noses and the loose annular member is provided on the inner side with a few lugs evenly distributed along the inner periphery and one bar or tube has guide surfaces co-operating with said lugs.

By using the construction embodying the invention a coupling can be obtained in which the occurrence of play between the various parts can be avoided to a great extent or, respectively, reduced, whilst a uniform tightening of the loose, annular member to the links can be ensured.

It should be noted that a coupling is known from U.S. Pat. No. 3,268,252 in which a sleeve having a smaller diameter than the pole is screwed into the top end of the pole. Onto this sleeve are slipped two annular members provided with protruding noses, whilst these annular members receive between them recessed links fastened to the ends of bars. For locking up the annular members a further pole is screwed into the top end of the sleeve screwed into the pole. In order to fasten the links and annular members to one another bolts are passed through the links and the annular members.

This known construction comprises a large number of components and can be assembled only with difficulty. For example, the alignment of the bores provided in the annular members and the links for passing said bolts will be a time-consuming and troublesome operation. If, for example, the scaffolding comprising the coupling has to be disassembled and reassembled several times, various components may readily get lost, whilst the screwthread of the bolts is quite likely to be damaged resulting in further trouble in mounting and dismounting the coupling.

The invention will be described more fully hereinafter with reference to a few embodiments of the construction according to the invention illustrated in the accompanying Figures.

FIG. 4 is an exploded view of a plate from which a link can be made.

FIG. 5 is an elevational view of a link manufactured from the plate shown in FIG. 4.

FIG. 6 is a side elevation of the link of FIG. 5.

FIG. 7 is a plan view of the link of FIG. 6.

Figure 1:
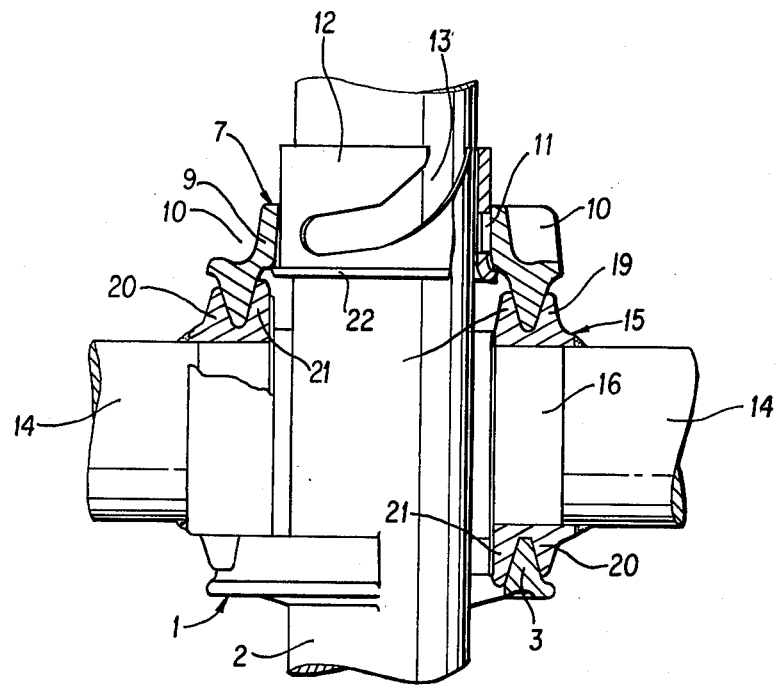
FIG. 1 is partly a sectional view and partly an elevational view of a first embodiment of a coupling in accordance with the invention together with parts of tubes interconnected with the aid of said coupling.

The coupling shown in FIG. 1 comprises a lower, annular member 1, which is welded in the embodiment shown to a tube 2 forming a pole of a scaffolding. Usually a plurality of such annular members 1 will be welded to the pole 2 at equal intervals.

Figure 3:
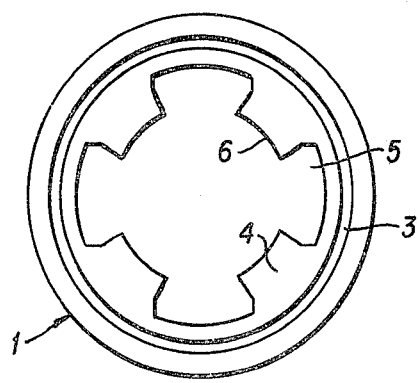
FIG. 3 is a plan view of a lower annular member of the coupling.

From the right-hand part of FIG. 1 it will be apparent that the annular member 1 comprises a web or nose 3 of at least substantially V-shaped section, the top side of which is flattened. The inner periphery of the web 3 is engaged by inwardly extending ridges 4, which form the boundaries of recesses 5 between them. The inner walls 6 of the ridges are located on a circle, the diameter of which is at least substantially equal to the outer diameter of the tube 2 and near the inner rims 6 the ridges 4 are welded to the tube 2 (FIG. 3).

The coupling comprises furthermore an upper, annular member 7, which also comprises an annular web or nose 8 of substantially V-shaped section, the lower edge of which is flattened. To the top side of the annular web adjoins an annular part 9 extending above the annular web and the connection between the annular part 9 and the annular web 8 is strengthened by radially extending ridges 10.

The inner periphery of the annular part is preferably provided with two lugs 11 extending inwardly from the inner wall of the annular part. These lugs 11 co-operate with grooves 13 in a sleeve 12 for receiving the lugs. It will be seen that the groove 13 is shown, in fact, in a position turned through an angle of 90° relative to the correct position in FIG. 1.

The sleeve 12 intimately surrounds the pole 2 and is welded to the pole 2 at the appropriate distance from the lower annular member 1. It will furthermore be apparent from the figure that the groove 13 is open at the top side of the sleeve 12 and that the top part of the groove 13 is fairly steep and extends at an angle to the longitudinal axis of the pole 2, whereas the last part of the downwardly extending end of the groove 13 is only at a small angle to a plane at right angles to the longitudinal axis of the pole 2. When the upper annular member 7 is turned on the sleeve 12 the annular member 7 will be urged downwards with the aid of the lugs 11 moving in the grooves 13.

With the pole 2 are connected the ends of horizontal tubes 14. For this purpose the end concerned of each tube 14 is received in an opening 16 in a link 15, to which it is welded. In this embodiment the links are formed by forged pieces and as will be apparent from FIG. 2 lateral boundary faces 17 of the link are at an angle of about 60° to one another, whilst prolongations of these faces 17 intersect one another at the centre of the pole 2.

On the top side the link 15 is provided with two ridges 18 and 19 of at least substantially V-shaped section, being coaxial with the centre line of the pole 2 and having equal heights (the right-hand link in FIG. 1).

In a similar manner the link 15 is provided on the underside with two downwardly extending ridges 20 and 21 of at least substantially V-shaped section. The ridge 20 has the same height as the ridges 18 and 19, whereas at least the medium part of the inner ridge 21 has a larger height. The construction is such that this part of the ridge 21 of larger height fits in a recess 5 so that by this part of the ridge 21 fitting in the recess 5 the link 15 can be prevented from turning with respect to the lower annular member 1. From the right-hand part of FIG. 1 it will be seen that the ridges 18 to 21 are constructed so that the recesses formed between these ridges or noses can receive with close fit the webs 3 and 8 of the rings. A firm clamp of the links 5 can thus be obtained by turning the upper annular member 7, said turning resulting in a downward displacement of the upper annular member 7 owing to the co-operation of the lugs 11 with the grooves 13. In order to turn the annular member 7 a hammer or the like may be used to strike the reinforcing ridge 10.

In order to prevent the ring 7 from assuming an inclined position at the beginning in the event of an unevenly distributed number of links 15 between the annular members 1 and 7, the sleeve 12 is provided on its underside with an outwardly bent-over supporting rim 22, on which will bear the annular member 7 by the underside of the annular part 9.

When the prolonged ridges 21 are downwardly directed as is shown in the right-hand part of FIG. 1, only four tubes 14 can be coupled with the pole 2 so that these tubes 14 are evenly arranged around the pole 2 at an angle of 90° to one another, since otherwise the prolonged ridges 21 cannot be received in the recesses 5.

Figure 2:
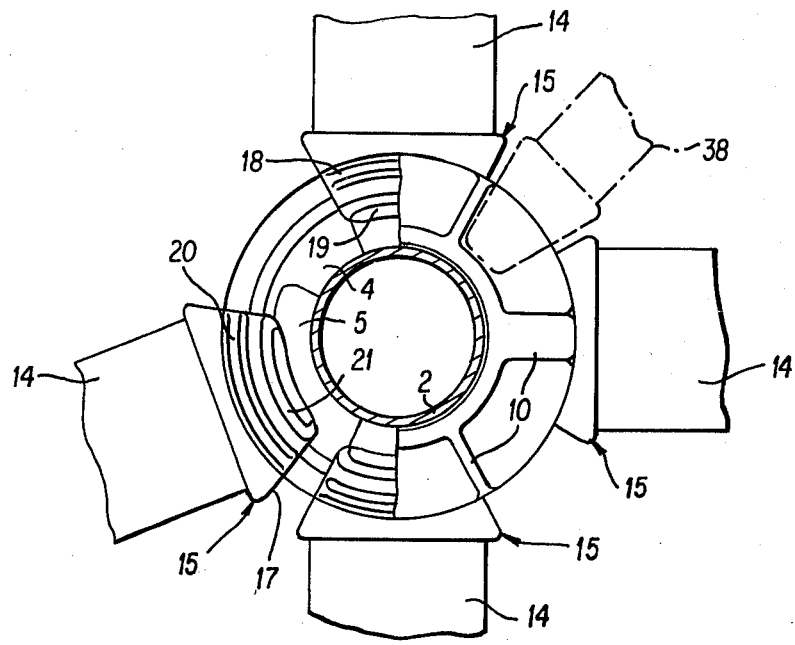
FIG. 2 is a plan view of the structure of FIG. 1 an upper annular member not being shown in the left-hand part of FIG. 2.

However, when the tube 14 with the link 15 fastened thereto is turned out of the position shown in the right-hand part of FIG. 1 through 180°, so that the prolonged ridge 21 snaps into the interior of the annular member 7, the horizontal tubes 14 can be disposed in any desired position as is shown in FIG. 2 for the extreme left-hand tube, in which case more than four tubes 14 can be coupled at one junction with the pole 2. This possibility of disposing a horizontal tube 14 in any position relative to the pole 2 is important, for example, when a scaffolding has to be erected at a curved wall, for example, of a tower or a curved ship's wall.

When the construction described above is employed, the play occurring in a junction formed by the coupling according to the invention depends upon appreciably fewer factors than in the case of the conventional constructions. The annular members and in particular the annular noses of at least substantially V-shaped section can be accurately machined in the form of forged pieces. The links 15 with the V-section recesses bounded by the protruding ridges can likewise be made in the form of forged precision pieces so that a substantially play-free connection can be established between these parts.

A further advantage of the construction embodying the invention is that it readily permits of carrying out a surface treatment, for example, thermal zinc deposition for protecting the parts against rust without great risk of droplet formation at undesirable places such as the fitting surfaces.

When the construction embodying the invention is used, a link can be effectively made from a piece of sheet material as shown in FIG. 4. From FIG. 4 it will be apparent that a piece of sheet 23 is used as basic material for the link, the end of said sheet being slightly broader than the middle. On both sides notches 24 are made in the sheet.

The ends of the sheet can be bent over to the rear with respect to the central part 25 of the sheet to be bent so that the sheet parts having the notches 24 are located in planes at an angle of about 60° to one another. Subsequently those parts of the sheet that are located on the side of the notches 24 remote from the central part 25 can be folded around the end of the tube as is illustrated in FIGS. 6 and 7 and be welded to this tube 14. The notches 24 have a suitable shape for receiving the annular webs 3 and 8 in the manner described above. A protruding tongue 26 fits in the recess 5.

Figure 8:
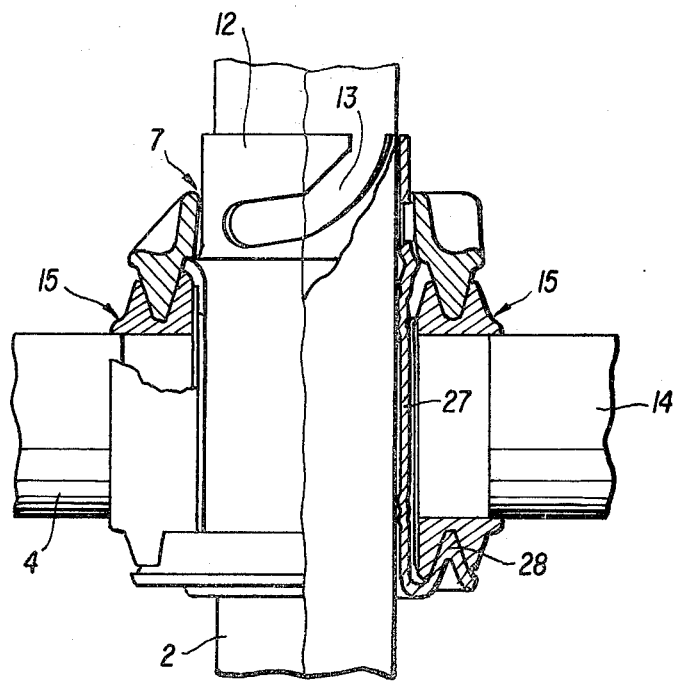
FIG. 8 is partly an elevational view and partly a sectional view of a second embodiment of a coupling in accordance with the invention with parts of tubes interconnected with the aid of this coupling.

FIG. 8 shows a second embodiment of the coupling in accordance with the invention. The parts of this embodiment corresponding with the parts described in the preceding embodiment are designated by the same reference numerals.

In the embodiment shown in FIG. 8 the sleeve 12 is provided with a tubular prolongation 27 being integral with said sleeve 12 and located below the same, which prolongation can be simply and effectively fixed to the pole 2 by means of indents in the tubular prolongation or by means of a dismountable set bolt. The lower rim of the prolongation 27 is first bent upwards in the manner shown in FIG. 8 and subsequently bent down to form an uninterrupted nose or web 28 of at least substantially V-shaped section, which has the same function as the annular web 3 of the embodiment first described. The further structure and operation of the coupling are the same as those of the embodiment described above.

By using this construction an appropriate transfer of force to the pole 2 is obtained. A further advantage is that the pole 2 can be zinc-plated prior to the disposition of the sleeve 12 with the prolongation 26 on the pole 2, since the fixation of the prolongation 26 does not require a welding joint, whilst the various component parts can be separately zinc-plated.

The embodiment of the coupling shown in FIG. 8 can also be very effectively employed for intercoupling screw rams or scaffolding tubes employed in conjunction with one another as supporting members and having to be relatively coupled for obtaining the required rigidity.

Figure 9:
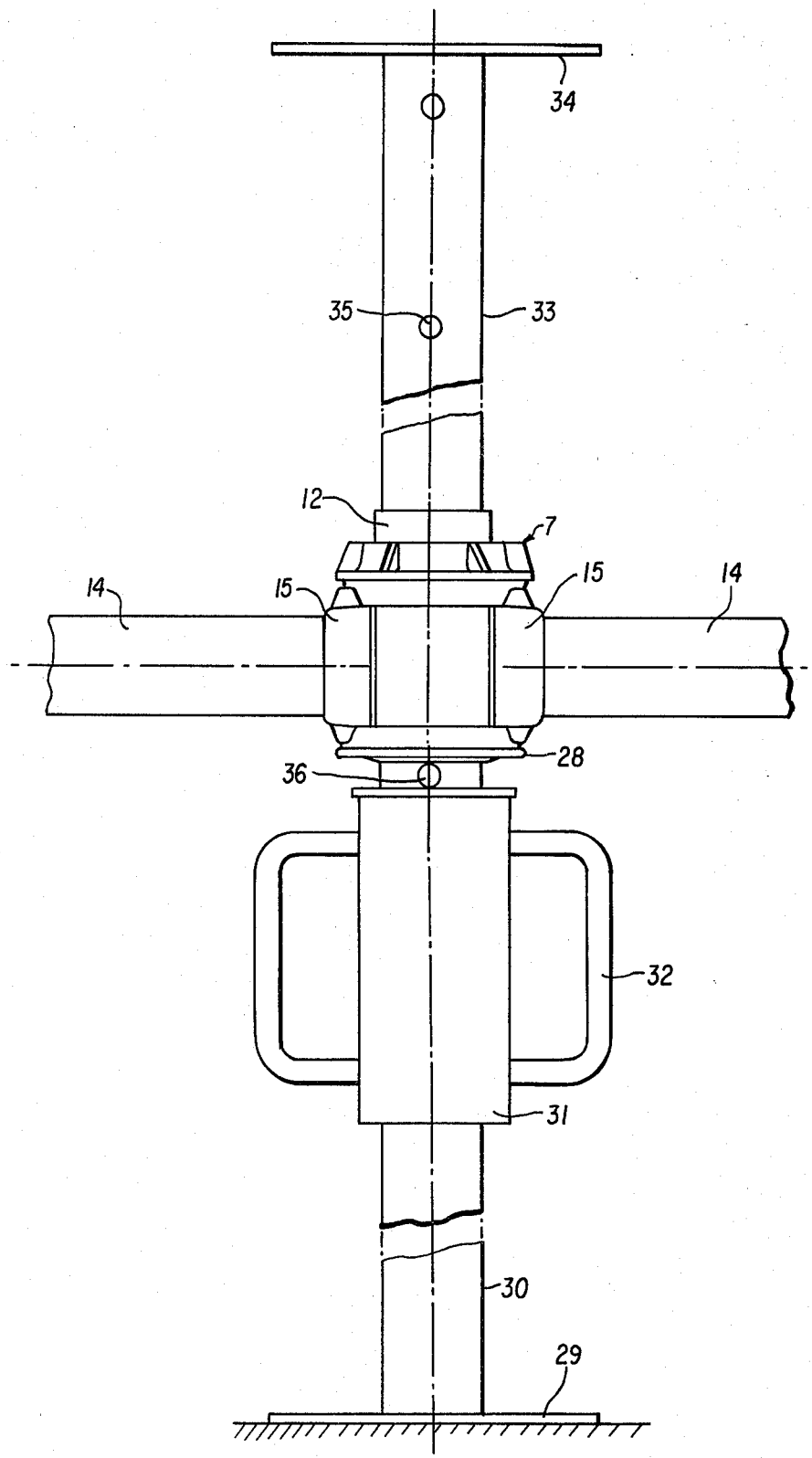
FIG. 9 illustrates the use of a coupling embodying the invention with the aid of screw spindles.

FIG. 9 shows that such a screw ram comprises a vertical tube 30 equipped with a foot plate 29, the top end of said tube being provided with a sleeve 31 adjustable in a direction of height with the aid of a screw joint. For displacing the sleeve 31 handles 32 are fastened to the sleeve. The sleeve 30 receives the lower end of a sleeve 33 having a smaller diameter than the sleeve 30 and being slidable in a direction of height with respect to the sleeve 30. The top end of the sleeve 33 is provided with a supporting plate 34. Holes 35 are provided at equal intervals in the sleeve 33. A pin 36 can be passed at will through one of these holes 35 to bear on the top of the sleeve 31 in order to prevent the sleeve 33 from sliding down in the sleeve 30. If it is desired to relatively couple a plurality of such rams with the aid of horizontal tubes 14, the coupling shown in FIG. 8 can be used, in which the tubular member 27 can be loosely slipped onto the sleeve 33 and be guarded against a downward movement since the lower side of the sleeve 27 will bear on the pin 36.

As is furthermore shown in FIG. 2 the construction is also suitable for coupling struts 38 or the like, if these struts are provided at one end with appropriate coupling pieces 39, which can be locked between the annular members.

Although in the embodiments shown and described above the protruding noses are provided on the annular members and the recesses receiving said noses in the links, it is also possible to provide the noses on the links and the recesses in the annular members.

If three or more grooves 13 are provided in the sleeve 12, the supporting rim 22 may frequently be omitted, since the ring will then be held in place by the co-operating lugs 11 and grooves 13.

Figure 11:
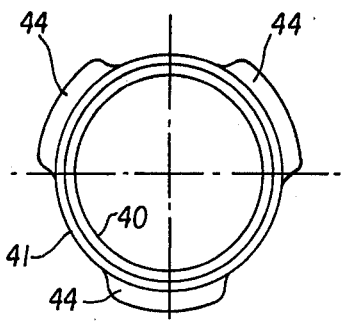
FIG. 11 is a plan view of the structure of FIG. 10, the fixed, annular member being omitted.
Figure 10:
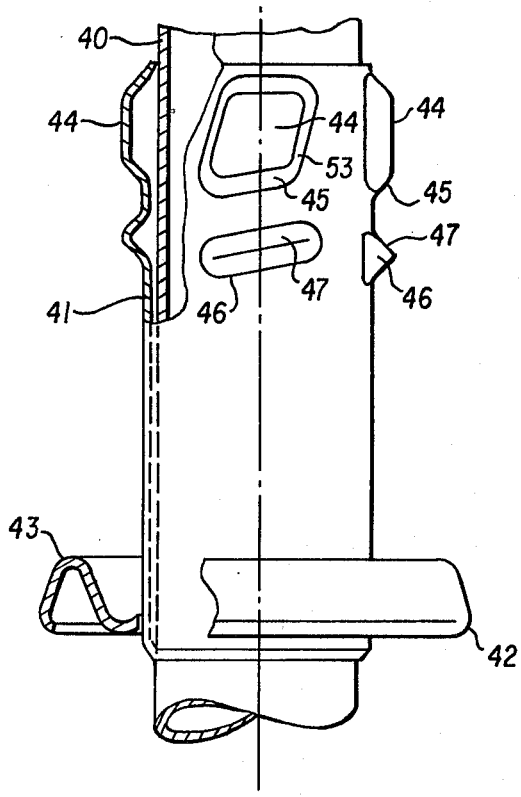
FIG. 10 is an elevational view of a pole provided with an annular member fastened thereto and with guide lugs for the loose, annular member.

In the embodiment shown in FIGS. 10 and 11 a sleeve 41 surrounds a pole 40 and is fastened thereto, preferably by fixing the ends of the sleeve 41 by rolling to the outer periphery of the pole 40. To the lower end of the sleeve is secured an annular member 42, which is folded from sheet material so that the annular member 42 has a circular nose 43 of at least substantially V-shaped section.

The top end of the sleeve 41 has three embossed parts or lugs 44 evenly spaced apart around the pole 40 as is shown in FIG. 11. The lower boundary edge 45 of these lugs is at an angle to a plane at right angles to the longitudinal axis of the pole 40. Below the embossed parts or lugs 44 the sleeve 41 has furthermore embossed parts or lugs 46, the top surfaces 47 of which are at least substantially parallel to the lower surfaces 45 of the lugs 44.

Figure 12:
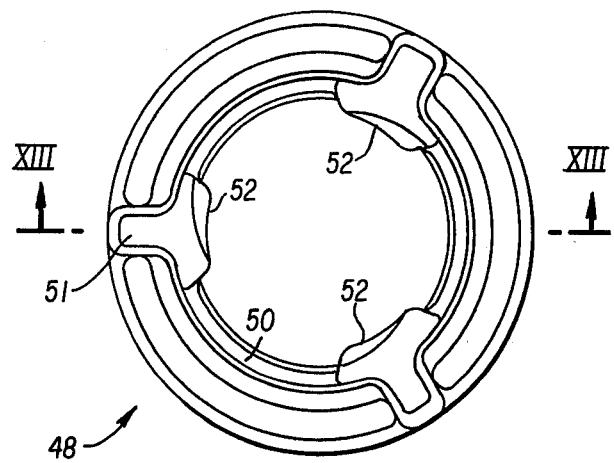
FIG. 12 is a plan view of a loose, annular member suitable for use in the construction shown in FIGS. 10 and 11.
Figure 13:
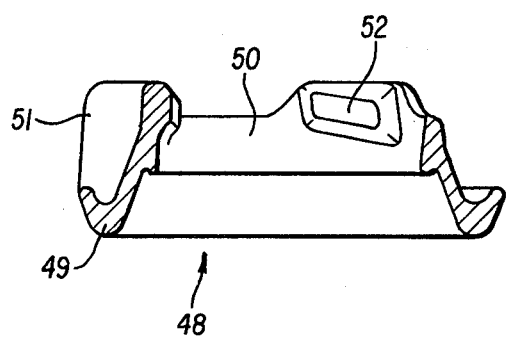
FIG. 13 is a sectional view of FIG. 12 taken on the line XIII—XIII in FIG. 12.

The loose annular member 48 intended for co-operation with the construction shown in FIGS. 10 and 11 is illustrated in FIGS. 12 and 13. Particularly from FIG. 13 it will be apparent that the lower part of said annular member forms a circular nose 49 of at least substantially V-shaped section, to the top end of which is joined an annular part 50 of smaller diameter. The connection between the annular part 50 and the annular nose 49 is reinforced with the aid of three at least substantially radially extending ridges 51 on the outer periphery of the annular member 48. The inner periphery of the annular member is provided with three inwardly extending lugs 52, the top and bottom boundary faces of which are at an angle to a plane at right angles to the longitudinal axis of the annular member 48.

It will be obvious that the loose, annular member 48 can be slipped from above onto the pole 40 into a position such that the lugs 52 can move downward between the lugs 42, after which the annular member 48 can be turned so that the lugs 52 can move below the lugs 42 and owing to the co-operation between the inclined boundary faces of the lugs the annular member 48 will be urged downwards. Otherwise the use and the operation of this construction correspond with those of the embodiments described above. However, since the lower faces 45 and the top faces 47 are also at an acute angle to a plane at right angles to the centre line of the pole 40 and the location of the faces of the lugs 52 co-operating with the faces 45 and 47 is adapted thereto, radial play will be obviated when the ring 48 is loaded in the direction of the face 45 or the face 47 respectively.

By arranging the upwardly extending boundary faces 53 at an angle to the longitudinal axis of the pole rather than parallel thereto the annular member 48, when put in place, is turned around the pole to an extent such that the lugs 52 are guided towards the top faces 47 of the lugs 46.

I claim:

1. A coupling for intercoupling at least two substantially orthogonal bars or tubes comprising:
    an annular member surrounding one said bar or tube and rigidly fastened thereto, a loose, annular member positioned on said one bar or tube, and a link fastened to one end of each said other said bar or tube and positionable between said annular members, wherein the end of each said link has recesses and protruding noses and wherein the annular members are provided with protruding noses fitting in the recesses of said links and wherein the loose, annular member is provided on the radially inner side thereof with a plurality of lugs evenly distributed along the radially inner periphery of said loose annular member, and wherein said one bar or tube has guide surfaces co-operating with said lugs which clamp said loose annular member, said guide surfaces having a portion at an acute angle to a plane at right angles to said tube.

2. A coupling as claimed in claim 1 wherein the noses of said annular members have a substantially V-shaped section.

3. A coupling as claimed in claim 1 or 2 wherein the noses of said annular members and the recesses of said annular members extend concentrically with the center line of said one bar or tube.

4. A coupling as claimed in claims 1 or 2 wherein lateral boundary faces of each said link are at an angle of at least substantially 60° to one another and prolonged planes of said boundary faces intersect one another in the center line of the one bar or tube.

5. A coupling as claimed in claims 1 or 2 wherein each said link is bounded on one side by one said nose positionable radially inward with respect to each said annular member wherein the heights of said noses of said links are not equal, and wherein said rigid annular member has relatively spaced recesses for receiving the link nose having the larger height, whereas said loose annular member receives the higher link nose in any position.

6. A coupling as claimed in claims 1 or 2 wherein said lugs co-operate with guide surfaces of the bars or tubes.

7. A coupling for intercoupling at least two substantially orthogonal rods or tubes: comprising an annular member surrounding one said bar or tube and rigidly secured thereto, an annular member loosely positioned on said one rod or tube, and a link fastened to one end of each said other bar or tube and positionable between the annular members, wherein said loose annular member is provided with a plurality of equally spaced lugs protruding inwardly from the radially inner surface thereof, and wherein said one bar or tube includes guide surfaces for both axial sides of the lugs, which clamp said loose annular member, said guide surfaces having a portion at an acute angle to a plane at right angles to said tube.

8. A coupling as claimed in claim 7 wherein said one bar or tube is surrounded by a sleeve having grooves defining said guide surfaces.

9. A coupling as claimed in claim 7 wherein said one bar or tube is provided with a sleeve, the wall of which has axially spaced embossed parts forming second lugs, the proximal boundary surfaces of which co-operate with said lugs provided on said loose annular member.

10. A coupling as claimed in claim 9 wherein proximal boundary faces of said second lugs are at an acute angle to a plane at right angles to the longitudinal axis of the one bar and the faces of the lugs on the annular member co-operating with said boundary faces extend in a similar manner.

11. A coupling as claimed in claim 9 or 10 wherein upwardly extending boundary faces of the topmost second lug are inclined.

12. A coupling as claimed in claims 9 or 10 wherein a lower side of the sleeve is provided with a protruding rim which supports said fixed annular member.

13. A coupling as claimed in claim 9 or 10 wherein said sleeve includes a prolongation, the lower rim of which is folded over, forming a protruding nose.

14. A coupling as claimed in claim 13 wherein said sleeve and the prolongation of the sleeve are fixed to the one bar or tube by a deformation of the wall of one of the sleeve and the prolongation respectively.

15. A coupling as claimed in one of claims 7 or 8 or 9 or 10 wherein said link is formed of folded sheet material.

* * * * *